United States Patent [19]
Perkins

[11] 4,150,925
[45] Apr. 24, 1979

[54] FAST ACTING CHECK VALVE

[75] Inventor: Gerald S. Perkins, Altadena, Calif.

[73] Assignee: California Institute of Technology, Pasadena, Calif.

[21] Appl. No.: 830,212

[22] Filed: Sep. 2, 1977

[51] Int. Cl.² ............................................. F04B 17/04
[52] U.S. Cl. ................................... 417/418; 137/456; 137/486; 417/505
[58] Field of Search ................... 137/456, 486, 487.5; 417/418, 505

[56] References Cited

U.S. PATENT DOCUMENTS

| | | | |
|---|---|---|---|
| 2,701,331 | 2/1955 | Holst | 417/418 |
| 2,912,997 | 11/1959 | Griswold | 137/456 |
| 3,282,220 | 11/1966 | Inman | 417/418 |
| 3,303,787 | 2/1967 | Inman | 417/418 |
| 3,485,264 | 12/1969 | Schulze, Jr. | 137/486 |
| 3,860,029 | 1/1975 | Hubler | 137/487.5 |

*Primary Examiner*—C. J. Husar
*Attorney, Agent, or Firm*—Freilich, Hornbaker, Wasserman, Rosen & Fernandez

[57] ABSTRACT

A check valve which closes more rapidly to prevent wearing of the valve seat and of the valve member that seals thereagainst, including a solenoid or other actuator that aids the normal spring to quickly close the valve at approximately the time when downpath fluid flow would stop, the actuator then being deenergized. The control circuit that operates the actuator can include a pair of pressure sensors sensing pressure both upstream and downstream from the valve seat. Where the valve is utilized to control flow to or from a piston pump, energization of the actuator can be controlled by sensing when the pump piston reaches its extreme of travel.

8 Claims, 3 Drawing Figures

FAST ACTING CHECK VALVE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to check valves, and also to a check valve which is useful for controlling fluid flow to and from a high pressure reciprocating pump.

The rate at which hydrocarbon wells and the like can be drilled can be greatly increased by increasing the pressure of the mud-water drilling fluid which is pumped down the drill string to the drill bit. Although greatly increased drill rates can be achieved by increasing the drilling mud pressure from a typical pressure such as 3,000 psi to a high pressure such as 15,000 psi, it is found that the pumping equipment has a much shorter lifetime, particularly for the pump and its valves. My earlier patent application Ser. No. 774,229 filed Mar. 4, 1977, describes a reciprocating mud pump for producing high pressures, which pumps a large volume with each stroke to minimize the number of times the valves must open and close, to thereby increase the valve life. Additional steps which could increase the life of the valves would make the utilization of high drilling fluid pressures more economical.

SUMMARY OF THE INVENTION

In accordance with one embodiment of the present invention, a check valve is provided which wears more slowly than usual. The check valve includes a valve seat and a poppet or valve member which can move against and away from the seat, and also may include a spring that urges the valve member against the seat. In order to avoid wear on the valve parts which occurs during the time the valve member is moving towards the valve seat, an actuator is provided which is operated by a control circuit to more rapidly move the valve member against the valve seat at the proper time.

In one system, the actuator of the check valve is controlled by a circuit which includes a pair of pressure sensors that sense the pressure at the upstream and downstream ends of the valve. This circuit is contructed so that when the pressure differential drops to a low level, the actuator is energized to quickly close the valve. In another system, the check valve actuator is energized at a time when the piston of a reciprocating pump which pumps fluid through the valve, approaches its extreme position.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
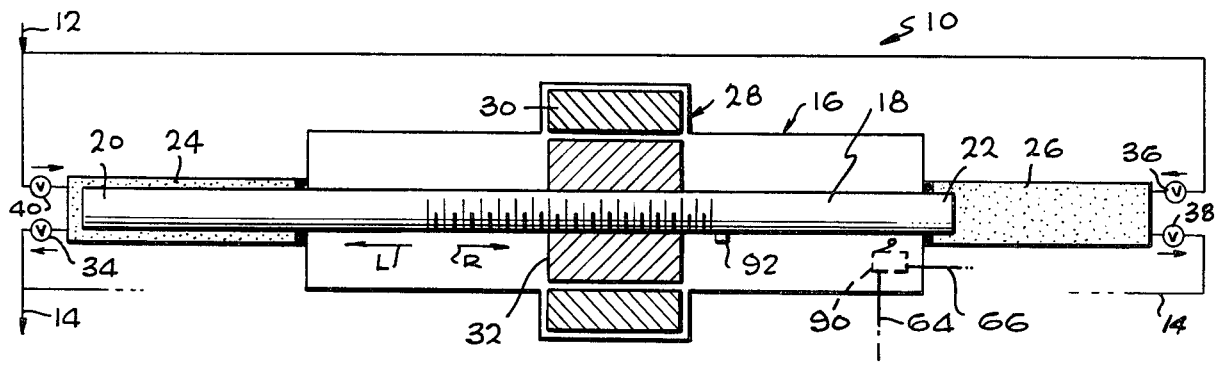
FIG. 1 is a simplified sectional side view of a pump and valve system constructed in accordance with the present invention.
Figure 3:
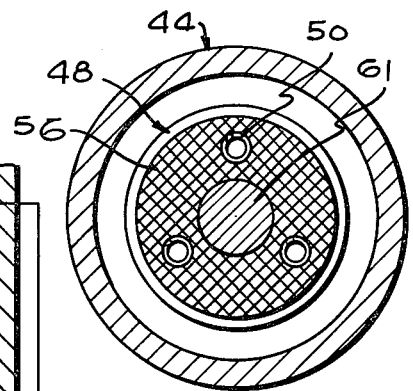
FIG. 3 is a view taken on the line 3—3 of FIG. 2.

FIG. 1 illustrates a pumping system 10 which receives a drilling fluid through an input line 12, and which delivers the fluid through an output line 14 at very high pressure. Pumping is accomplished by a pump 16 which includes a long piston 18 whose end portions 20, 22 and received in chambers or cylinders 24, 26. The piston is reciprocated by an electric motor 28 which includes a stator 30 and a rotor 32, the rotor being threadably connected to a threaded middle portion of the piston. When the piston is moving in the direction of arrow L, fluid is pumped out of cylinder 24 and into an outlet conduit along which an outlet check valve 34 is positioned, to the outlet line 14. At the same time, the other cylinder 26 receives fluid from an inlet check valve 36. Conversely, when the piston starts moving in the other direction as indicated by arrow R, fluid is pumped out of cylinder 26 through another outlet check valve 38, while the cylinder 24 is receiving fluid from inlet check valve 40.

Figure 2:
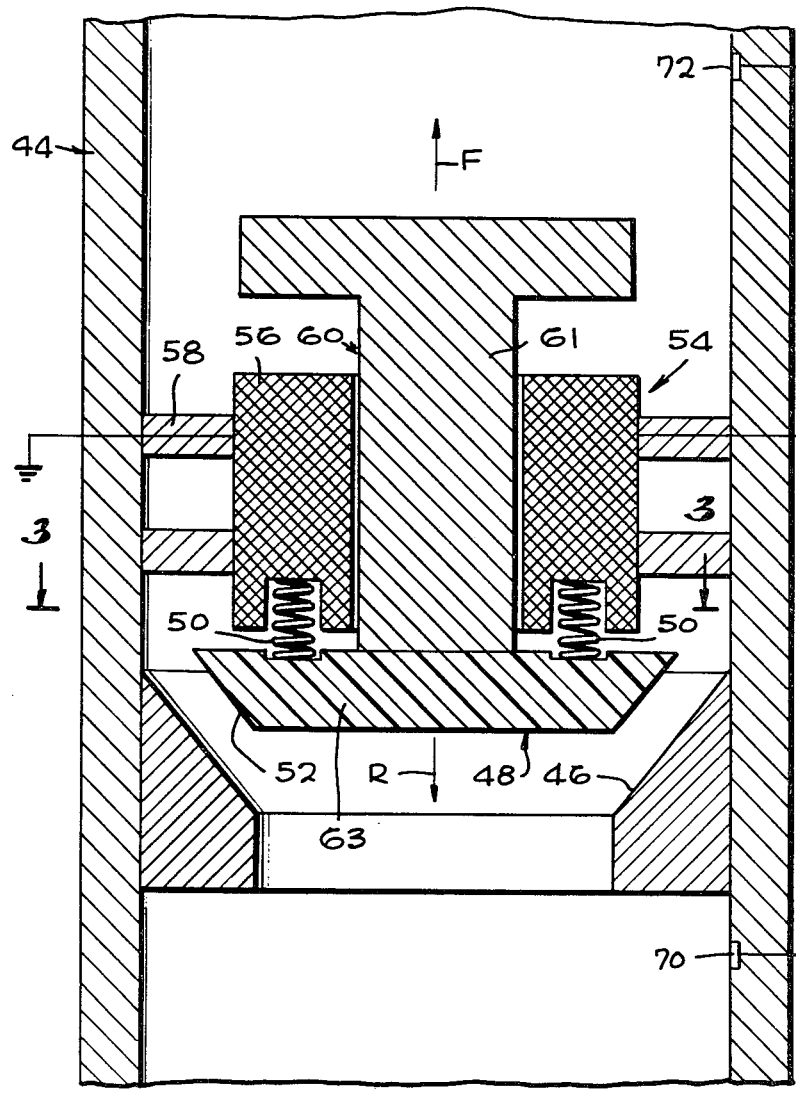
FIG. 2 is a sectional side view of one of the valves of the system of FIG. 1.
Figure 2:
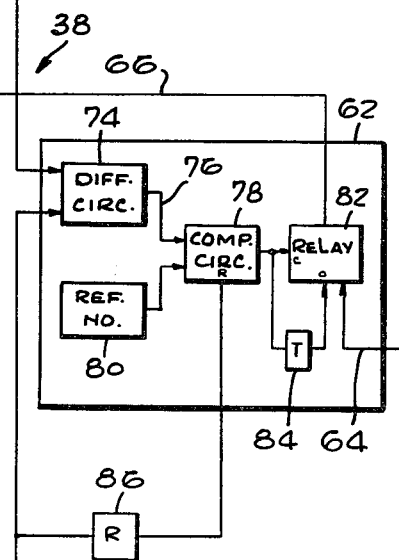

FIG. 2 illustrates details of the outlet check valve 38 which allows fluid flow substantially only in the direction of arrow F. The valve includes a housing 44, walls forming a valve seat 46 in the housing, and a valve poppet or valve member 48 which is slideably mounted with respect to the housing and which can move against and away from the valve seat 46. A group of poppet springs 50 urge the valve member 48 towards the valve seat so that a sealing portion 52 of the valve member seals against the valve seat.

In accordance with the present invention, an actuator in the form of a solenoid 54 is provided which can supply force in the same direction R as the springs 50, to urge the valve member towards the valve seat. The solenoid 54 includes a coil 56 held by a spider 58 to the valve housing, and an armature 60 which slides within the coil. A circuit 62 supplies current from a power line 64 through a line 66 to the coil, at the proper time, to energize the solenoid coil so that it supplies force to quickly close the valve. The armature 60, which is constructed of a magnetically attractable material, has a middle portion 61 which is slideably guided with respect to the valve housing and which holds a member 63 that forms the sealing portion 52 of the valve member. The valve member part 63 may be constructed of a non-magnetic material so that it does not hamper operation of the solenoid.

The purpose of the solenoid 54 is to move the valve member 48 against the valve seat more quickly than could be accomplished just by the springs 50. Although the pump pumps fluid under very high pressure through the check valve, rapid flow can be obtained with only a moderate pressure difference between fluid lying upstream and downstream from the check valve. Thus, the springs 50 which tend to close the valve, must be chosen to supply only a moderate force to the valve member. The solenoid 54 can increase this force just during the period when the valve is closing, to obtain rapid valve closure. As will be discussed below, a large amount of wear on the valve occurs during the closure period, and decreasing this period can significantly increase valve life.

The circuitry for controlling the flow of current to the solenoid, includes two transducers 70, 72 that can sense the difference in pressure on opposite sides of the check valve. As the pump pumps fluid in the direction of arrow F through the check valve, there is a moderately higher pressure at the transducer 70 than at the transducer 72. However, when the piston completes its stroke and starts moving in the reverse direction, the pressure at transducer 70 rapidly drops to a low level such as from 15,000 psi to 1,000 psi while pressure at the other transducer 72 drops by a much smaller amount. The large pressure drop at transducer 70 occurs because it can only equal the pressure at which fluid is supplied to the drilling fluid pump (at inlet line 12). As a result of the sudden and very large pressure drop at the end of the valve where the transducer 70 is located, a very rapid reverse or regurgitant fluid flow occurs through the check valve while the valve member 48 is moving towards the valve seat 46. The solenoid 56 moves the valve member more rapidly to minimize the amount of such regurgitant flow.

The two transducers, 70, 72, are connected to a differential circuit, 74, of the main control circuit 62. During the pumping of fluid in the direction of arrow F the transducer 70 will sense a moderately higher pressure than the transducer 72 due to pressure losses through the check valve. The outputs of the transducers are delivered to a difference circuit 74, whose output line 76 will represent a relatively high number during pumping. However, when pumping begins to stop, as the piston 18 approaches its extreme position and slows down prior to reversing, the at transducer 70 will be only slightly higher than the pressure at transducer 72. The output of the difference circuit, which represents the pressure at 70 minus the pressure at 72, will then be a smaller number (which may even be zero or negative). A comparer circuit 78 compares the output of the different circuit 74 and a reference number stored in a register 80. When the output of the different circuit drops to a low level, the comparer circuit delivers a pulse to the relay 82 to latch it closed and thereby energize the solenoid. Thus, the solenoid can begin to move the valve member even before the springs 50 would begin such movement. For example, when fluid is pumped at a pressure such as 15,000 psi, a pressure drop across the valve of more than 50 psi might be expected, so that the circuit can be constructed to energize the solenoid when the pressure at 70 minus the pressure at 72 is less than about +50 psi.

A timing circuit 84 delivers a pulse to the relay 82 to open it after a brief period following energization of the solenoid. This is desirable to save current and avoid excessive wear on the parts, as well as to enable rapid opening of the check valve when the pump begins to pump fluid in a forward direction therethrough. A reset circuit 86 which senses when the pressure at transducer 70 again reaches a very high level, which occurs when pumping through the check valve begins again, resets the comparer circuit 78 so it can later deliver another pulse to the relay 82 at the end of the pumping stroke. It is also possible to utilize a single sensor which senses a pressure drop at the outlet of the pump, to then energize the actuator.

Instead of measuring pressures at opposite ends of the check valves to determine when to energize the solenoid, it is possible to merely sense the position of the piston 18 in FIG. 1. FIG. 1 shows, in phantom lines, a switch 90 positioned in the path of a boss 92 on the pump piston, which senses when the piston is reaching the end of its stroke. The switch 90 controls the flow of current from the power line 64 to the line 66 that supplies current to the solenoid, so that current is supplied to close the check valve as the piston approaches its extreme forward position. Soon after the piston reverses, the lug 92 no longer closes the switch 90 and current ceases to flow through the solenoid. The precise position of the lug-engaging portion of the switch with respect to the lug 92 on the piston, determines the precise time in each cycle at which the check valve closes.

As mentioned above, a high proportion of valve wear occurs during the regurgitant flow of high pressure fluid through the closing check valve. This is because where very high pressures are pumped by a reciprocating pump of the type shown in FIG. 1, a very high pressure differential occurs when the piston reverses, so that the velocity of regurgitant flow may be several orders of magnitude larger than the velocity of forward flow with the valve open. The mud drilling fluid typically utilized contains significant amounts of abrasive particles which cause rapid wearing during such high velocity flow.

Where the actuator, which helps move the valve member of the check valve closed, is a solenoid, a capacitor discharge solenoid energizing arrangement can be utilized, wherein a previously charged capacitor is connected to the solenoid to drive it rapidly. Instead of solenoids, it is possible to use other types of actuators. For example, a mechanism can be utilized which is moved by the piston of the drilling fluid pump, to forcefully shut the check valve as the piston approaches its extreme position.

In a pumping system 10 of FIG. 1, four check valves 34-40 are utlized and each of them can be constructed in the manner shown in FIG. 2.

Thus, the invention provides apparatus for minimizing wear on a check valve, especially where very high fluid pressures are utilized. This is accomplished by the provision of an energizable actuator that is operated approximately at the time when a spring on the check valve would tend to close the valve. The actuator can add to the spring force to achieve very rapid valve closure to minimize or even prevent regurgitant flow. The actuator is deenergized, or at least energized at only a much lower level, at the time when a considerably larger pressure is to be applied at the upstream end of the valve than at the downstream end so that the valve will then readily open. The actuator can be controlled by pressure sensing means which senses the differential pressure at two positions spaced along the fluid path, such as at opposite ends of the valve, or even which senses pressure at only one position. Where the check valve is connected to a reciprocating pump, the actuator of a check valve can be controlled by a switch or the like which energizes the actuator only when the piston is at or near the extreme end of its travel.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A check valve which minimizes regurgitant flow, comprising:

a housing forming a fluid path and having walls forming a valve seat;

a valve member moveable in an up-path direction against said valve seat and in a downpath direction away from said valve seat;

an energizable actuator coupled to said valve member to apply a large force urging said valve member toward said valve seat; and means responsive to at least the eminent termination of downpath fluid flow past said valve seat, for energizing said actuator so it applies a large force to said valve member that urges it towards said valve seat, and for then ceasing the energization of said actuator so it ceases the application of said large force to said valve member to allow the valve member to be easily moved away from the valve seat.

2. The check valve described in claim 1 wherein:

said energizing means includes at least one pressure transducer positioned along said fluid path for sensing a pressure decrease in said fluid.

3. The check valve described in claim 2 wherein:

said energizing means includes a second pressure transducer positioned along said fluid path at a location spaced along said path from the location of said first named transducer, and means for energizing said actuator to force it towards said valve seat when the pressure at the most up-path of said locations minus the pressure at the most downpath of said locations decreases below a predetermined value.

4. The check valve described in claim 1 wherein said valve is coupled to the outlet of a reciprocating pump with a piston, and wherein:

said energizing means include means responsive to the piston of the reciprocating pump reaching a position at least adjacent to one of its extreme positions, for energizing the actuator.

5. The check valve described in claim 1 including:

spring means constantly applying a force to said valve member to keep it closed when said actuator is not energized to apply a large force.

6. A check valve apparatus comprising:

walls forming a valve sea;

a valve member moveable against and away from said valve seat;

a solenoid connected to said valve member, said solenoid being energizable to force said valve member towards said valve seat; and means for energizing said solenoid, between the time when the flow of material in a direction from the valve seat to the valve member portion which seals thereagainst is decreasing to a low level, and the time when substantial backflow occurs in the opposite direction.

7. The apparatus described in claim 6 including:

a high pressure mud pump having an inlet for receiving drilling mud and having an outlet conduit, said valve seat disposed along said outlet conduit, whereby to minimize valve wearing caused by the high pressure mud.

8. In a high pressure mud pump system which includes a chamber, a piston moveable in said chamber, an inlet for delivering mud to said chamber, an outlet conduit for carrying mud pumped out of said chamber by said piston, and a check valve disposed along said outlet conduit including a valve seat, a valve member moveable against said seat, and a spring urging said member against said valve seat, the improvement for minimizing wear on the valve member and valve seat, comprising:

solenoid means connected to said valve member, for applying a force to said valve member which acts in the same direction as said spring and at approximately the same time as said spring would by itself move said valve member toward the valve seat, whereby to minimize the time when the valve is partially closed which is when greates wear occurs.

* * * * *